US008397030B2

(12) United States Patent
Cantin et al.

(10) Patent No.: US 8,397,030 B2
(45) Date of Patent: Mar. 12, 2013

(54) EFFICIENT REGION COHERENCE PROTOCOL FOR CLUSTERED SHARED-MEMORY MULTIPROCESSOR SYSTEMS

(75) Inventors: Jason F. Cantin, Austin, TX (US); Steven R. Kunkel, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1000 days.

(21) Appl. No.: 12/144,759

(22) Filed: Jun. 24, 2008

(65) Prior Publication Data

US 2009/0319726 A1    Dec. 24, 2009

(51) Int. Cl.
    *G06F 12/08*    (2006.01)
(52) U.S. Cl. .......................... 711/141; 711/144
(58) Field of Classification Search .......... None
    See application file for complete search history.

(56) References Cited

U.S. PATENT DOCUMENTS

| 4,814,970 | A | 3/1989 | Barbagelata et al. |
|---|---|---|---|
| 6,449,700 | B2 | 9/2002 | Hagersten et al. |
| 6,751,698 | B1 | 6/2004 | Deneroff et al. |
| 7,360,032 | B2 | 4/2008 | Cantin et al. |
| 2006/0179252 | A1 | 8/2006 | Cantin et al. |
| 2007/0022256 | A1 | 1/2007 | Cantin et al. |
| 2007/0255908 | A1* | 11/2007 | Zeffer et al. ............. 711/141 |
| 2008/0155200 | A1* | 6/2008 | Conway ............... 711/146 |

FOREIGN PATENT DOCUMENTS

WO    WO9912102    3/1999

OTHER PUBLICATIONS

Cantin et al., "Coarse-Grain Coherence Tracking: Regionscout and Region Coherence Arrays", IEEE Micro, vol. 26, No. 1, pp. 70-79, Jan./Feb. 2006.*
Cantin, "Coarse-Grain Coherence Tracking" Dissertation, University of Wisconsin at Madison, Jan. 2006.*
Jason F. Cantin et al., Improving Multiprocessor Performance with Coarse-Grain Coherence Tracking, Proceedings of the 32nd Annual International Symposium on Computer Architecture, IEEE, 2005.
Deqing Chen et al., Exploiting High-level Coherence Information to Optimize Distributed Shared State, ACM SIGPLAN symposium on principles and practice of parallel programming (PPoPP 2003) and workshop on partial evaluation and semantics-based program manipulation (PEPM 2003), San Diego, CA.
Martin Schulz et al., Owl: Next Generation System Monitoring, Proceedings of the 2nd conference on Computing frontiers, pp. 116-124, 2005, Ischia, Italy.

* cited by examiner

*Primary Examiner* — Than Nguyen
(74) *Attorney, Agent, or Firm* — Yudell Isidore Ng Russell PLLC

(57) ABSTRACT

A system and method of a region coherence protocol for use in Region Coherence Arrays (RCAs) deployed in clustered shared-memory multiprocessor systems which optimize cache-to-cache transfers by allowing broadcast memory requests to be provided to only a portion of a clustered shared-memory multiprocessor system. Interconnect hierarchy levels can be devised for logical groups of processors, processors on the same chip, processors on chips aggregated into a multichip module, multichip modules on the same printed circuit board, and for processors on other printed circuit boards or in other cabinets. The present region coherence protocol includes, for example, one bit per level of interconnect hierarchy, such that the one bit has a value of "1" to indicate that there may be processors caching copies of lines from the region at that level of the interconnect hierarchy, and the one bit has a value of "0" to indicate that there are no cached copies of any lines from the region at that respective level of the interconnect hierarchy.

20 Claims, 6 Drawing Sheets

EFFICIENT REGION COHERENCE PROTOCOL FOR CLUSTERED SHARED-MEMORY MULTIPROCESSOR SYSTEMS

BACKGROUND OF THE INVENTION

1. Technical Field

The present invention relates in general to the field of computers, and in particular to clustered shared-memory multiprocessors. More particularly, the present invention relates to an efficient region coherence protocol for clustered shared-memory multiprocessor systems.

2. Description of the Related Art

To reduce global bandwidth requirements within a computer system, many modern shared-memory multiprocessor systems are clustered. The processors are divided into groups called symmetric multiprocessing nodes (SMP nodes), such that processors within the same SMP node may share a physical cabinet, a circuit board, a multi-chip module, or a chip, thereby enabling low-latency, high-bandwidth communication between processors in the same SMP node. Two-level cache coherence protocols exploit this clustering configuration to conserve global bandwidth by first broadcasting memory requests for a line of data from a processor to the local SMP node, and only sending memory requests to other SMP nodes if necessary (e.g., if it is determined from the responses to the first broadcast that the requested line is not cached on the local SMP node). While this type of two-level cache coherence protocol reduces the computer system global bandwidth requirements, memory requests that must eventually be broadcast to other SMP nodes are delayed by the checking of the local SMP node first for the requested line, causing the computer system to consume more SMP node bandwidth and power. It is important for performance, scalability, and power consumption to first send memory requests to the appropriate portion of the shared-memory computer system where the cached data is most likely to be found.

There have been prior proposals for improved request routing in two-level cache coherence protocol systems in clustered multiprocessor systems, such as, for example Power6 systems by IBM Corporation. For example, the In, and Ig "pseudo invalid" states in the coherence protocols of such systems are used to predict whether a requested line of data is cached on the local SMP node, or on other SMP nodes. However, there are several limitations to using these states.

First, a line of data must be brought into a processor cache and subsequently must be taken away by intervention to reach one of these states. These states only optimize subsequent requests by the processor to reacquire the cache line of data (temporal locality) and do not optimize the initial access to the data since a line request is sent to all processors. Second, they do not exploit spatial locality beyond the cache line, so a processor must collect and store information for each such line of the cache. Third, these states take up space in the processor's cache hierarchy, displacing valid data. Fourth, these states only help if they can remain in the cache hierarchy long enough, before being replaced by valid data, for the data to be accessed again. Finally, additional states must be added to handle additional levels of hierarchy in the system interconnect (for example where a separate hierarchical level exists for processors on a single chip, on a module, on a board, on an SMP node, or on a cabinet), thereby increasing cache coherence protocol complexity.

Use of these "pseudo invalid" states does not exploit spatial locality beyond the line of data requested, and does not define a region coherence protocol.

There have been prior proposals for Region Coherence Arrays (RCAs) which optimize global bandwidth by keeping track of regions from which the processor is caching lines, and whether other processors are caching lines from those regions. However, these proposals are for multiprocessor systems that are not clustered—that is, there is a single, flat interconnect of processors. As such, these proposals for RCAs are suboptimal for clustered multiprocessor systems having hierarchical interconnects, since they cannot exploit cases where data is shared, for example, by only processors on the same SMP node. Furthermore, these proposals include RCAs which invalidated regions from which the processor is no longer caching lines in response to external requests. This dynamic self-invalidation made it easier for other processors to obtain exclusive access to regions, however the processor receiving the request threw away useful information that could have been used to optimize subsequent requests.

SUMMARY OF THE INVENTION

Disclosed is a system and method of a multilevel region coherence protocol for use in Region Coherence Arrays (RCAs) deployed in clustered shared-memory multiprocessor systems which optimize cache-to-cache transfers (interventions) by allowing broadcast memory requests to be provided to only a portion of a clustered shared-memory multiprocessor system and not requiring that such requests are provided to all processors in the system. The present region coherence protocol is simple to implement and easily scales up as levels of interconnect hierarchy are added to computer system designs. Interconnect hierarchy levels can be devised for logical groups of processors, processors on the same chip, processors on chips aggregated into a multichip module, multichip modules on the same printed circuit board, and for processors on other printed circuit boards, and processors in other cabinets. The present region coherence protocol includes one bit per level of interconnect hierarchy, such that the one bit has a set value of, for example, "1", to indicate that there may be processors caching copies of lines from the region at that level of the interconnect hierarchy, and the one bit has a non-set value of, for example, "0", to indicate that there are no cached copies of any lines from the region which includes the requested line at that level of the interconnect hierarchy.

With the present region coherence protocol, Coarse-Grain Coherence Tracking (CGCT) utilizing RCAs can be extended to optimize bandwidth, power, and latency in clustered shared-memory multiprocessor systems by identifying to which level(s) of the interconnect hierarchy to send memory requests, and to send memory requests only to those levels, thereby increasing the efficiency of the protocol. Other levels of the interconnect hierarchy can be skipped, reducing request traffic and power-consumption at those levels, and avoiding the latency of checking those levels for the requested data. The present region coherence protocol is simple and scalable, with state bits taken directly from the snoop response for the region, and requires only one state bit for each level of the interconnect hierarchy. In addition, the present region coherence protocol implements an improved form of dynamic self-invalidation that does not throw away the external status of a region in the process of giving another processor exclusive access to the region, thereby exploiting greater temporal locality. The external status of a region indicates whether processors at a given level of the interconnect hierarchy external to the requesting processor are caching lines from the region.

Additionally, the present region coherence protocol does not encode information about lines cached by the processor, but only encodes the external status of the region. Therefore, on external requests (i.e., requests from another processor for a line of data) the RCA can give another processor exclusive access to the line of data without changing its region coherence state, provided the processor is not caching any lines from the region. However, if the external request is from a level of the interconnect hierarchy that has not previously cached lines from the region, a corresponding bit must be set in the region coherence state to indicate that lines from the region, which includes the requested line, are now being cached by the hierarchical level to which the processor that originated the external request belongs.

The above, as well as additional objectives, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION

Figure 1:
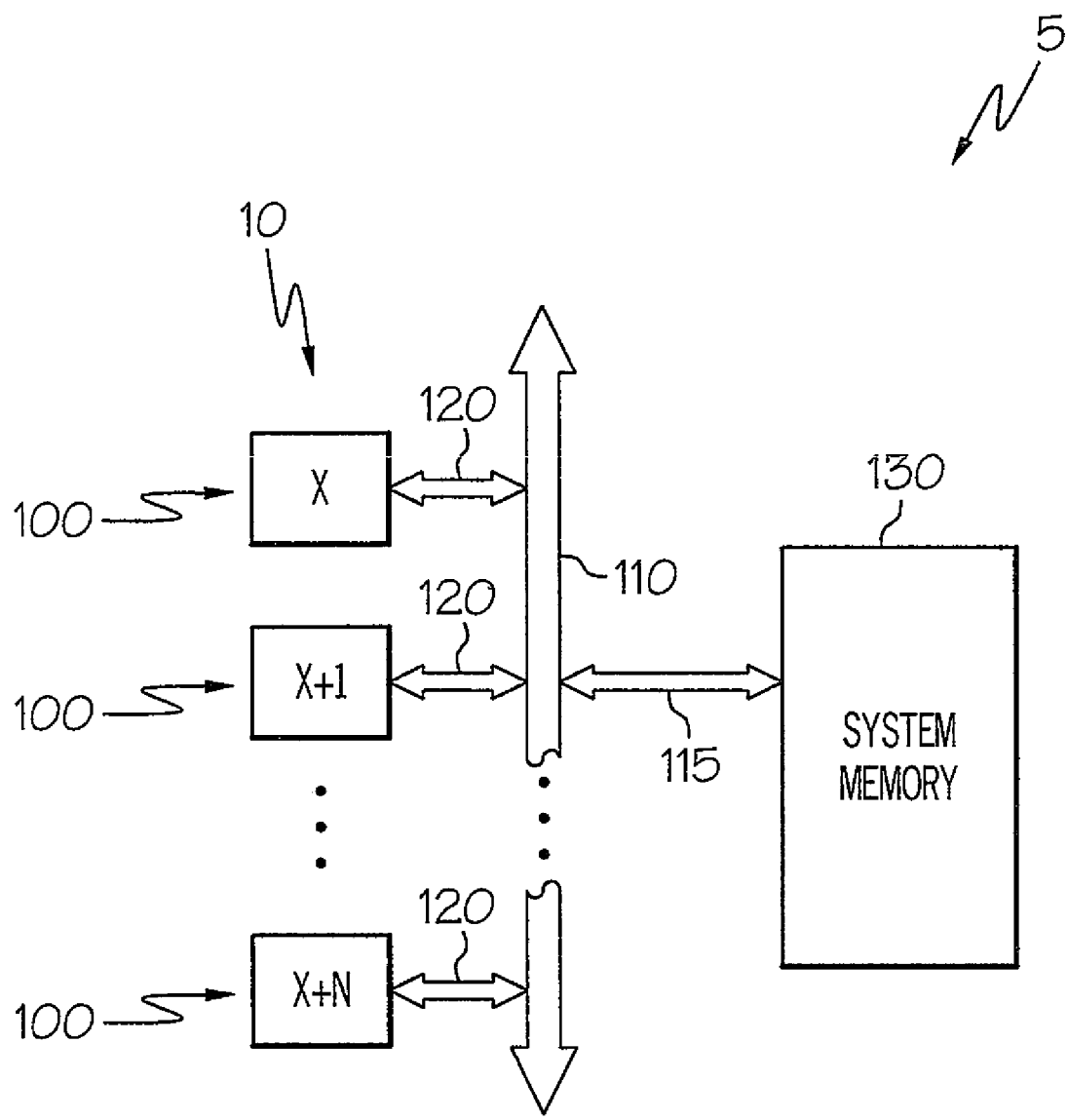
FIG. 1 depicts a high level block diagram of an embodiment of clustered processors of an SMP node, according to an embodiment of the present invention.

Reference will now be made in detail to the embodiments of the present invention, examples of which are illustrated in the accompanying drawings, wherein like reference numerals refer to the like elements throughout. The embodiments are described below in order to explain the present invention by referring to the figures. The specific reference numerals assigned to the elements are provided solely to aid in the description and not meant to imply any limitations (structural or functional) on the present invention.

The present invention provides a system and method of a multilevel region coherence protocol for use in Region Coherence Arrays (RCAs) deployed in clustered shared-memory multiprocessor systems which optimize cache-to-cache transfers (interventions) by allowing broadcast memory requests to be provided to only a portion of a clustered shared-memory multiprocessor system and not requiring that such requests are provided to all processors in the system. The present region coherence protocol is simple to implement and easily scales up as levels of interconnect hierarchy are added to computer system designs. Interconnect hierarchy levels can be devised for logical groups of processors, processors on the same chip, processors on chips aggregated into a multichip module, multichip modules on the same printed circuit board processors on other printed circuit boards, and processors in other cabinets. The present region coherence protocol includes one bit per level of interconnect hierarchy, such that the one bit has a set value of, for example, "1", to indicate that there may be processors caching copies of lines from the region at that level of the interconnect hierarchy, and the bit has a non-set value of, for example, "0", to indicate that there are no cached copies of any lines from the region which includes the requested line at that level of the interconnect hierarchy.

Referring to FIG. 1, a high level block diagram of an embodiment of a plurality of clustered processors $100_x \ldots 100_{x+n}$ in a multiprocessor shared-memory computer system 5, according to an embodiment of the present invention. Each of the plurality of processors $100_x \ldots 100_{x+n}$ communicates with each other, and with the system memory 130, via a system bus 110. Each of the processors $100_x \ldots 100_{x+n}$ communicates with the system bus 110 via a respective bus 120. The system memory 130 communicates with the system bus 110 via a bus 115. The cluster of processors $100_x \ldots 100_{x+n}$ forms a Symmetric Multiprocessor (SMP) node 10. The system 5 includes a plurality of such SMP nodes 10, each of which is connected to each other and to the system memory 130.

Figure 2:
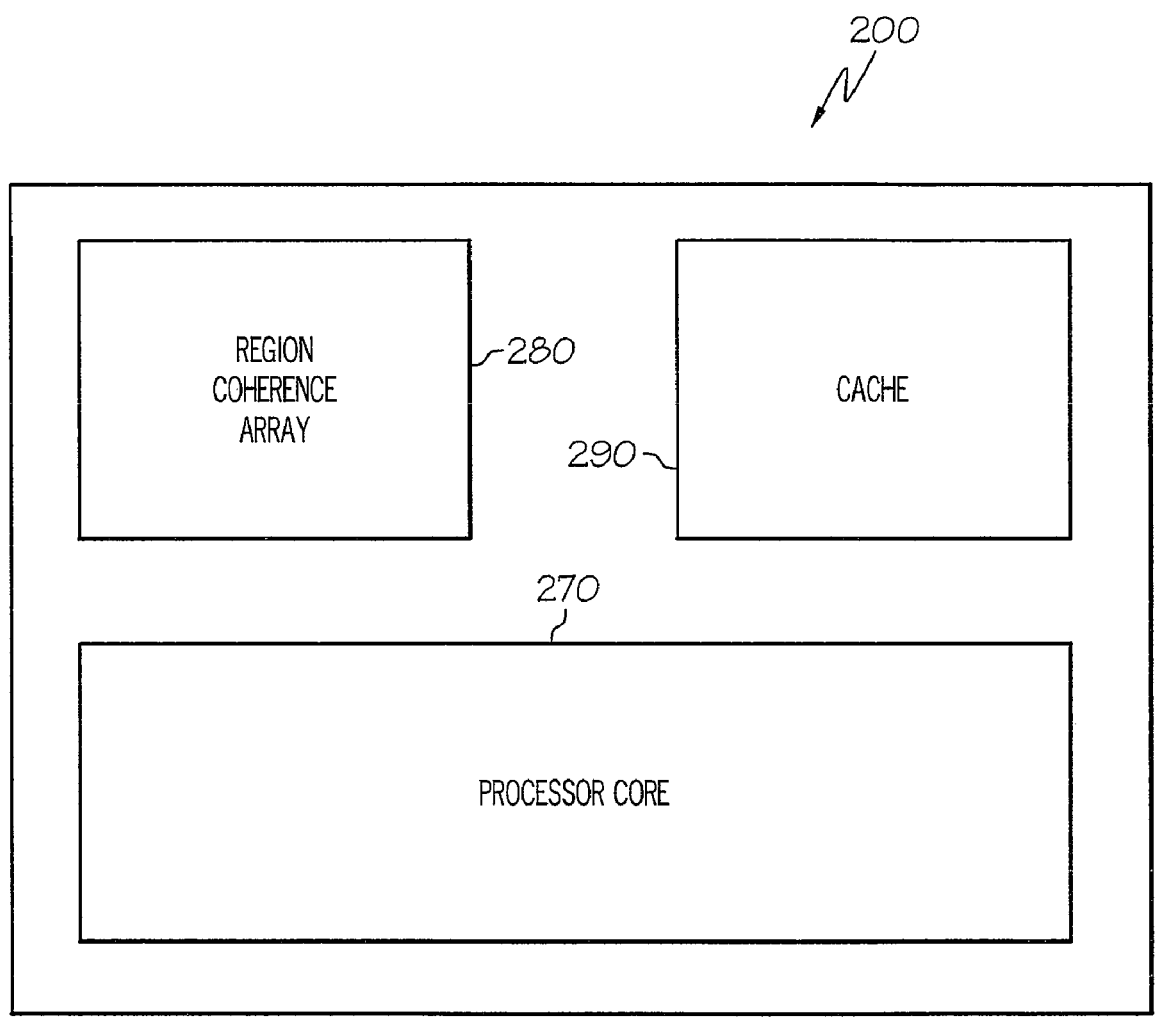
FIG. 2 depicts a high level block diagram of an embodiment of a processor of the SMP node of FIG. 1, according to an embodiment of the present invention.

Referring to FIG. 2, there is depicted an embodiment of a processor 200 which represents each of the plurality of processors $100_x \ldots 100_{x+n}$ of the shared-memory computer system 5 of the present invention. Processor 200 includes a processor core 270, a memory cache 290, and a Region Coherence Array (RCA) 280 associated with the cache 290.

In general, caches in such a system vary in size. For example, the cache 290 may include a plurality of lines of data which are each 64 bytes in size, where each line is from a region of a system memory 130 electronically connected to the processor 200, and may range in size from 128 bytes (2 lines of data) to 4 k bytes (1 physical page of the system memory 130, or 64 lines of data). In general, each cache 290 includes status of each line stored in the cache 290, and each RCA 280 includes status of a region of the system memory 130 which includes a plurality of lines of data.

The RCA 280 is an array of stored meta-data entries located in the cache hierarchy of processor 200, and is typically disposed near the lowest-level cache (for example, the L3 cache) of the processor 200 and is typically accessed in parallel with the lowest-level cache on processor requests and external snoops (described below in greater detail). The RCA 280 provides the status of a region and is tagged with an address of a defined region of the system memory 130. The RCA 280 is used to keep track of the status of the cache lines of each hierarchical level of cache associated with the processor core 270 by determining whether any lines within a region around a requested line have been previously cached, and if so the location of where those lines have been cached within the system 5. The cache 290 may be, for example, a lowest-level cache of the processor 200 in a multi-level hierarchical cache system design, where the RCA 280 would, in such example, include entries to indicate the status of all the lines in the L3 cache 290.

As described above, the shared-memory computer system which includes processor 200 may be designed such that cache 290 is a higher-level cache (for example, an L1 cache) and all lower-level caches (for example, L2 and L3 caches, not illustrated) are not disposed within the processor 200, but are disposed elsewhere in the system, but are associated with the processor 200. In such a case, the RCA 280 includes a set-associative array of meta-data entries corresponding only to lines of data associated with the L1 cache 290, and the all lower-level caches (not illustrated) which are associated with and disposed external to the processor 200 include an associated respective RCA which includes entries corresponding only to lines of data associated with the respective external lower-level L2 and L3 caches.

Figure 2A:
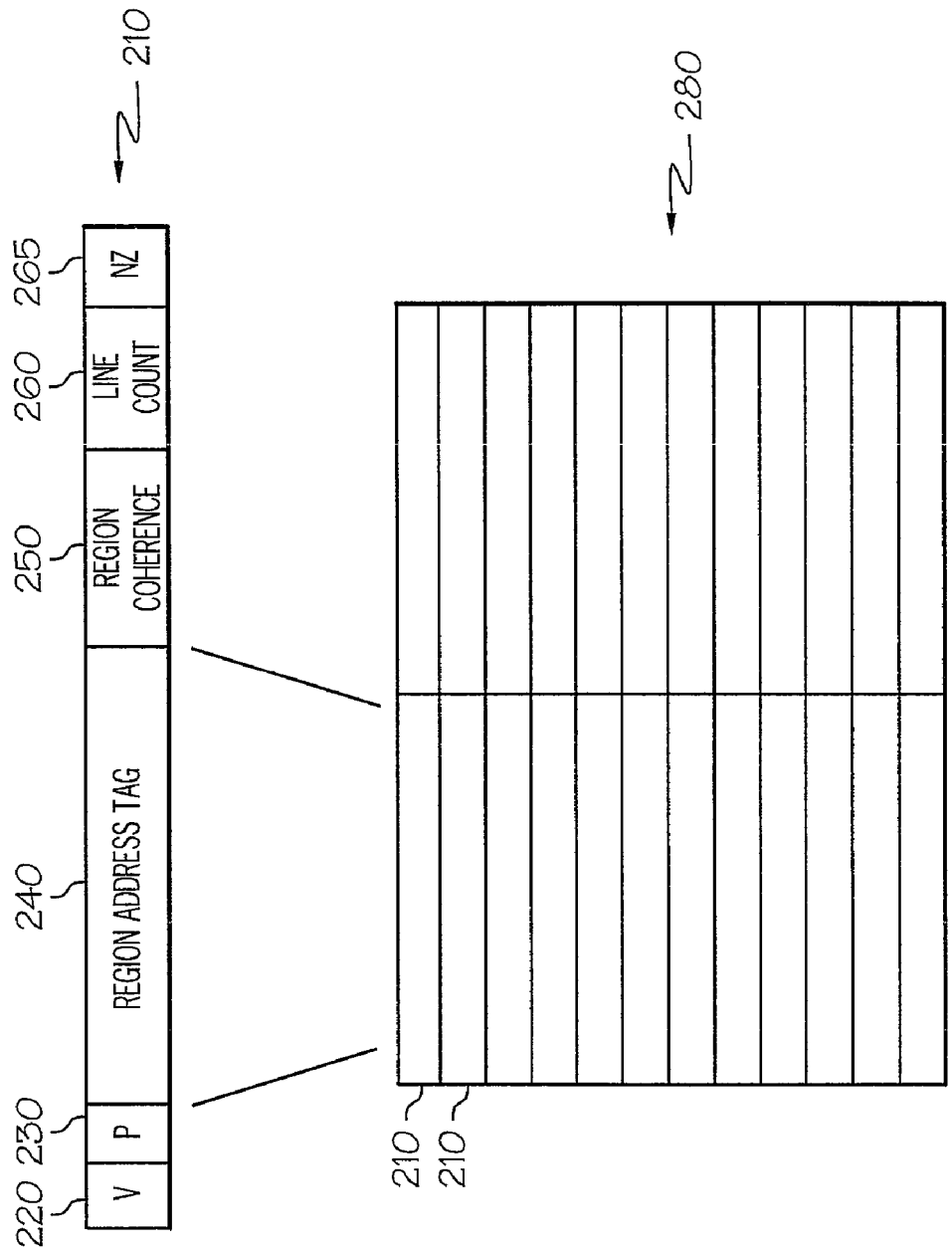
FIG. 2A is a block diagram depicting an embodiment of entries of a Region Coherence Array, according to the present invention.

Referring to FIG. 2A, each RCA 280 includes a plurality of entries 210 each of which may include a valid bit 220, one or more parity bits (or ECC bits) 230, a region address tag 240, a plurality of region coherence state bits 250, a plurality of line-count bits 260 (to keep track of how many lines from the region are cached by the processor 200), and a non-zero (NZ) bit 265. Each RCA entry 210 represents a large, aligned region of the system memory 130 that is a power-of-two multiple of the cache line size, and is no larger than a physical page of the system memory 130 (for example, no larger than a minimum physical page size supported by the computer system 5). The region coherence state bits 250 summarize the coherence status of the lines in the region, more specifically, the coherence status of lines in the region in the caches of other processors. The line-count bits 260 summarize whether the processor with which the RCA is associated is caching lines from the region, and are used when responding to other processors' requests to signal that lines are cached from the region around the requested line. The region coherence state bits 250 are used in conjunction with the line-count bits 260 to implement a region coherence protocol to more efficiently maintain cache coherence of the system 5.

The NZ bit 265, if used, is a bit to indicate a non-zero value of the line-count or presence bits 260 when the NZ bit 265 has a value of "0" and a zero value when it has a value of "1". The NZ bit 265 may be set whenever the line count is incremented or a presence bit is set. The NZ bit 265 may be cleared (set to a value of "0") whenever the line count is decremented to zero, or when the last presence bit is cleared. Use of the NZ bit 265 by the system 5 allows for faster access for external requests, since only the NZ bit 265 needs to be read by an external request without reading the value of the entire line count or presence bits 260 and then comparing that read value to zero to determine whether the line-count or presence bits 260 have a non-zero value.

In another embodiment, each entry 210 may also contain one or more bits to implement a least-recently-used (LRU) replacement policy for set-associative and fully-associative arrays. In a further embodiment, each entry 210 may include one or more presence bits instead of the line-count bits 260 (for example, one bit per cache line indicating whether the line is cached by the processor 200).

Entries 210 of the RCA 280 are allocated when lines from a region of memory around the requested line and are brought into the cache hierarchy of the processor 200. On broadcast snoops, requests not only check the caches 290 of other processors 200 for the requested line, but also check the RCAs 280 of the other processors 200 for the region surrounding the requested line. Each processor 200 responds with both the line status and the region status (whether the processor 200 is caching lines from the region), and the line response and region status of the processor 200 are combined with that of other processors 200 to form a combined snoop response (a line snoop response and region snoop response). Based on the region snoop responses, the region coherence state bits 250 are updated to reflect whether other processors 200 are caching lines from the same region, and this information is used to optimize the routing of future processor requests for lines in the region.

The region coherence protocol of the present invention utilizes interconnect hierarchy levels which can be devised for logical groups of processors 200, for example, for processors 200 on the same chip (not illustrated), or aggregated into the same module (not illustrated), or on the same SMP node 10, or on the same board (not illustrated), or in the same cabinet, etc., where, for example, the chip level may be at the lowest hierarchical level and the cabinet level may be the highest hierarchical level. Whether there are two or more levels of interconnect hierarchy in the system 5, the operation of the region coherence protocol is essentially the same. The bits of the region coherence state bits 250 would be encoded to indicate the level at which the processor 200 which has cached the requested line of data is disposed.

The present region coherence protocol includes one bit per level of interconnect hierarchy in the system 5, where a set value of "1" for the one bit indicates that there may be processors 200 caching copies of lines from the region at that level, and a non-set value of "0" for the bit indicates that there are no processors 200 caching copies of any lines from the region at that level. If a bit is set among the region coherence state bits 250, this indicates that at some time in the past, a processor 200 at that level cached lines from the region which includes the requested line. If the bit is not set among the region coherence state bits 250, this indicates that no processors 200 at that level within the system 5 currently cache any lines of the region which includes the requested line. The value of the bit(s) of the region coherence state bits 250 is described herein by way of example, and depends on a choice of design of the system 5.

The region coherence state bits 250 are updated with bits from the region snoop response, which also include one bit per level of the interconnect hierarchy, and are set if cached copies of lines from the region are detected at that level via the RCA 280 of another processor 200. On external requests, if the requested region is present and the line-count has a non-zero value (or a presence bit is set), the processor 200 sets the bit in the region snoop response corresponding to the lowest level of the interconnect hierarchy that the processor 200 shares with the requesting processor 200. If a global snoop is performed, the region coherence state bits 250 of the RCA 280 of the requesting processor 200 are set to the value of the region snoop response bits. If only the local SMP node 10 is snooped, the region coherence state bits 250 for that respective level of the interconnect hierarchy and for lower levels are set to be equal to the value of the level-identifying bits that is returned as the region snoop response. Thus, the region coherence state bits 250 for higher levels of the hierarchy are unchanged if a broadcast snoop did not get sent to processors 200 at those higher levels.

The region coherence state bits 250, which may be two or more bits, are used to determine where to route subsequent processor requests for lines of the same region. If no region coherence state bits 250 are set, meaning that no processor 200 in the system 5 has the requested line, then no broadcast snoop is required and the request need only obtain data from the system memory 130. If one bit of the region coherence state bits 250 is set, the request need only snoop the corresponding level of the interconnect hierarchy. If multiple bits of the region coherence state bits 250 are set, the request may need to go to one or more of the corresponding levels to find cached copies of the requested line. The manner in which the request is routed is a system design policy decision.

For example, in a two-level system 5 which includes multiple SMP nodes 10, the system interconnect is structured to allow faster access to processors 200 on the same SMP node 10 than for other SMP nodes 10. The region coherence bits 250 of the region protocol would contain two bits. If the first bit of the region coherence bits 250 of a first processor 200 is set to a value of "1", this would indicate that lines from the region of a requested line may exist in a cache 290 of other processors 200 of the same SMP node 10 as the first processor 200. If the first bit of the region coherence bits 250 of a first processor 200 is set to a value of "0", this would indicate that no lines from the region of a requested line exist in a cache 290 of other processors 200 of the same SMP node 10 as the first processor 200. Similarly, if the second bit of the region coherence bits 250 of a first processor 200 is set to a value of "1", this would indicate that lines from the region of a requested line may exist in a cache 290 of other processors 200 of other SMP nodes 10 than the SMP node 10 of the first processor 200. If the second bit of the region coherence bits 250 of a first processor 200 is set to a value of "0", this would indicate that no lines from the region of a requested line exist in a cache 290 of other processors 200 of SMP nodes 10 of other SMP nodes 10 than the SMP node 10 of the first processor 200.

The state of the region coherence bits 250 are independent from each other such that a state of one bit does not imply a state of the other bit. Also, there is no invalid state which is a combination of these bits. In this example, the state "11" of the region coherence bits 250 indicates that the requested line may be cached by processors 200 on the same SMP node 10 as the first processor 200, while the state "10" indicates that no processor 200 on the same SMP node 10 as the first processor 200 is caching the requested line (but that processors 200 on other SMP nodes 10 may be.)

For cases where a snoop is not needed at a level of the interconnect hierarchy for coherence, but the physical system memory 130 resides on a memory controller (not illustrated) at that level, a "silent snoop" may be sent. A silent snoop is a special, non-speculative request that other processors 200 ignore. Upon receiving a silent snoop request, the memory controller accesses DRAM (not illustrated) and sends the data back to the requesting processor 200 without waiting for a combined snoop response. Silent snoop requests are ignored by other processors 200, and therefore silent snoops have no snoop response.

Multiple policies may be used in cases where multiple region coherence state bits 250 are set. To minimize bandwidth requirements at the upper levels of the interconnect hierarchy, requests can be pumped from the lowest level of the interconnect hierarchy for which the corresponding region coherence state bit 250 is set, to the highest level, until a satisfying snoop response is received, indicating that it has been determined the location of where the processor 200 can get the requested line of data. To eliminate double-pumps (i.e., requests that iteratively snoop levels of the interconnect hierarchy), requests can be sent first to the highest level for which the corresponding region coherence state bit 250 is set. In another embodiment, memory read requests could be pumped to lower levels of the interconnect hierarchy to attempt to find a source copy of the line of data, and memory write requests could be pumped to the highest level right away to quickly invalidate cached copies of the requested line. In a further embodiment, memory read requests can be sent to the highest level of the interconnect hierarchy right away to minimize latency, while less latency-critical writes are pumped to conserve global bandwidth of the system 5.

TABLE 1

| Other Nodes | SMP Node | Region Coherence State Definition |
| --- | --- | --- |
| 0 | 0 | Region not cached elsewhere |
| 0 | 1 | Region cached by processors on same SMP node only |
| 1 | 0 | Region cached by processors on other nodes only, not by processors on the same SMP node. |
| 1 | 1 | Region cached by processors on the SMP node and other SMP nodes |

As shown above in Table 1, an example is depicted of an RCA 280 for a clustered multiprocessor system 5 having a two-level interconnect hierarchy. Table 1 depicts an example of the present region coherence protocol embodied as a two-bit region coherence protocol for a clustered shared-memory multiprocessor system 5 having two levels of interconnect hierarchy (for example, a first level for the local SMP node 10, and a second level for all SMP nodes 10 of the system 5). A processor 200 may send a memory request to either the processors 200 on the same SMP node 10, or to all the SMP nodes 10 in the system 5.

TABLE 2

| Other Nodes | SMP Node | Chip | Region Coherence State Definition |
| --- | --- | --- | --- |
| 0 | 0 | 0 | Region not cached by other processors |
| 0 | 0 | 1 | Region cached by other processors on the same chip only |
| 0 | 1 | 0 | Region cached by other processors on other chips on the same SMP node only |
| 0 | 1 | 1 | Region cached by other processors on the same chip & other processors in the same SMP node only |
| 1 | 0 | 0 | Region cached by processors on other SMP nodes only |
| 1 | 0 | 1 | Region cached by other processors on the same chip & processors on other SMP nodes only. Not cached by processors on other chips in the same SMP node. |
| 1 | 1 | 0 | Region cached by processors on other chips on the same SMP node & processors on other SMP nodes only |
| 1 | 1 | 1 | Region cached by other processors on the same chip, other chips on the same SMP node, & other SMP nodes |

As shown above in Table 2, an example is depicted of an RCA 280 for a clustered multiprocessor system 5 having a three-level interconnect hierarchy (i.e., a scheme regarding another embodiment of an implementation of the present region coherence protocol) such as, for example, a chip (not illustrated) which includes the processor 200, the local SMP node 10, and other SMP nodes 10.

For the embodiment of Table 1 and/or Table 2, there are one or more bits (in this example, one bit) of the region coherence state bits 250 for each level to indicate whether a processor 200 may be caching lines from the region at that respective level. If no bits are set (e.g., the first case, where each of the region coherence state bits 250 has a zero value), the request does not need to be broadcast to any level of the hierarchy, and the request may simply be sent to the system memory 130 (i.e., as a silent snoop). If one bit is set, whether for the chip, the SMP node 10, or the other SMP nodes 10, then only a broadcast to that level of the interconnect hierarchy is needed to obtain the line coherently. If multiple bits of the region coherence state bits 250 are set, it is a matter of policy of the system 5 regarding how the system 5 routes the memory request, where the system 5 does not waste time and bandwidth snooping levels of the interconnect hierarchy where no cached copies of the requested line are known to exist.

Figure 3:
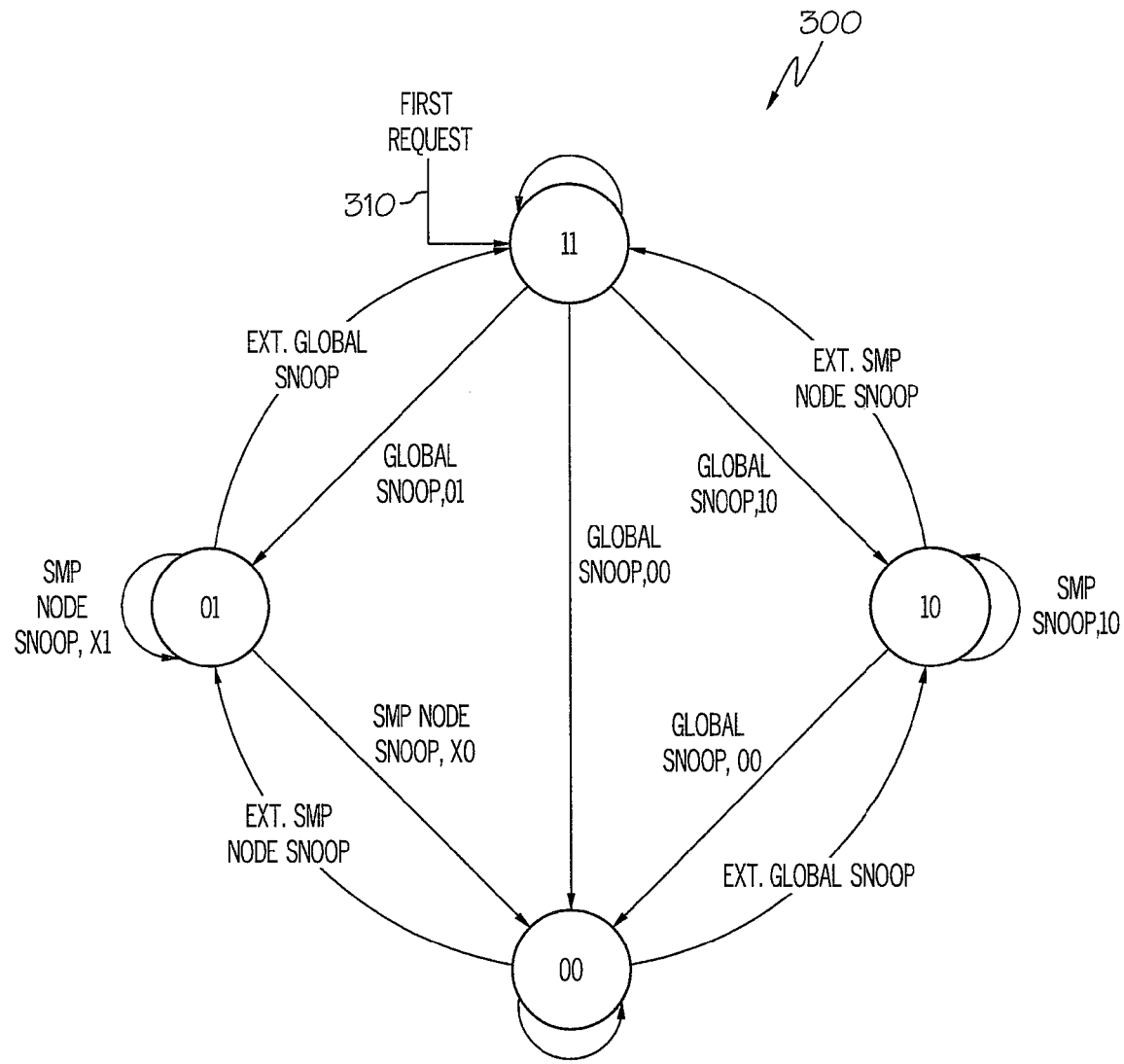
FIG. 3 is a state diagram of an embodiment of a region coherence protocol operation, according to the present invention.

FIG. 3 depicts a state diagram 300 illustrating how the present region coherence protocol may be implemented to operate for the system 5 having the two-level interconnect hierarchy, as depicted in Table 1. The embodiment of FIG. 3 is for illustrative purposes only and may have other configurations. A state machine implementing this state diagram 300 might not need to be implemented, for the region coherence state can be updated by simply overwriting one or more of the of the region coherence state bits 250. For each state transition of the state diagram 300 of FIG. 3 there is depicted a request that triggered it, and if it is request of a processor 200, then the region snoop response is also shown.

The two region coherence state bits 250 of this embodiment are conservatively initialized to have a value of "11" on allocation, to indicate that cached copies of lines in the region could be found anywhere in the system 5. The left-hand bit of the region coherence state bits 250 indicates whether there are cached copies of lines on other SMP nodes 10, and the right-hand bit indicates whether there are cached copies of lines on the same SMP node 10. If the left-hand bit is set to a value of "1", a global snoop may be required to obtain a copy of the data. In this simple example, this is the action taken, though the SMP node 10 can be pumped first. If the right-hand bit is set to a value of "1", there may be cached copies of lines in a cache on the same SMP node 10, and a node snoop may save global bandwidth of the system 5. If neither bit is set, a silent snoop is sent to the system memory 130.

In this embodiment, a global snoop is performed on the first request 310 for a line in the region. Doing so allows the region coherence state to be updated to reflect the current state of the system 5, and avoids a double-pump on the first request to a line in the region. Depending on the region snoop response, the region coherence state may be set to any of the four states (i.e., the "00", "01", "10", and "11" states). To simplify an implementation, the region coherence state bits 250 may be overwritten with the region snoop response bits from a global snoop. If there is an external request for a line in the region, the bit corresponding to the location of the requesting processor 200 in the system 5 may be set, which downgrades the region. Subsequent snoops for requests made by the processor 200 also update the state with their responses. Global snoops obtain information from all processors 200 and update all the region coherence state bits 250 by, for example, overwriting them with bits from the global snoop response. SMP node snoops only obtain information from other processors 200 on the same SMP node 10, and only update the right-hand bits pertaining to the SMP node 10 and lower levels of the interconnect hierarchy. The "X" in the region snoop response of node snoops represents a "don't care" condition, indicating that X=0, or X=1. Because coherence status was not collected for the levels of the interconnect hierarchy to which these bits pertain, they are not used to update the region coherence state, and so their value is a "don't care" condition.

Figure 4:
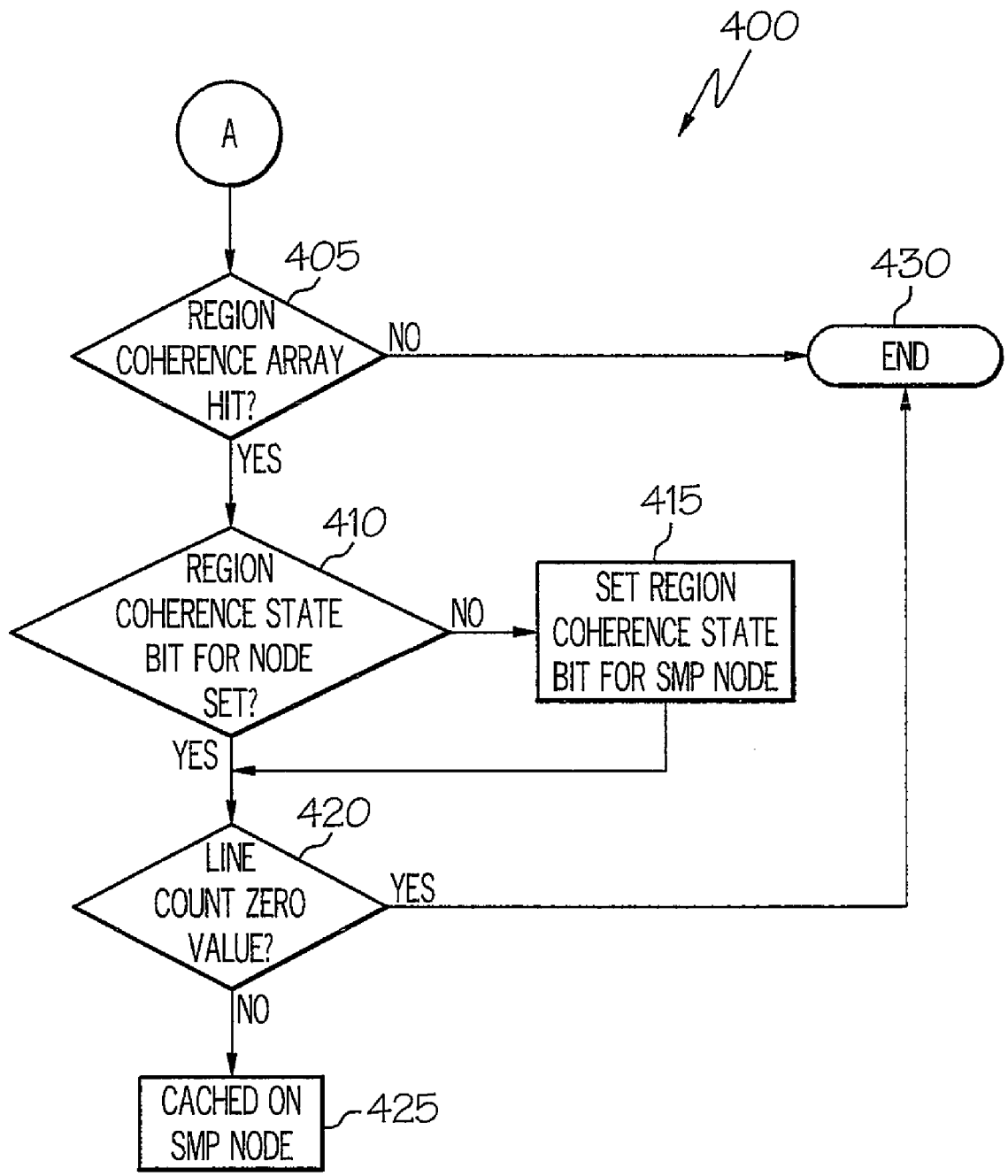
FIG. 4 is a high level logical flowchart of an embodiment of a region coherence protocol operation having an external request from a processor of the same SMP node, according to the present invention.
Figure 5:
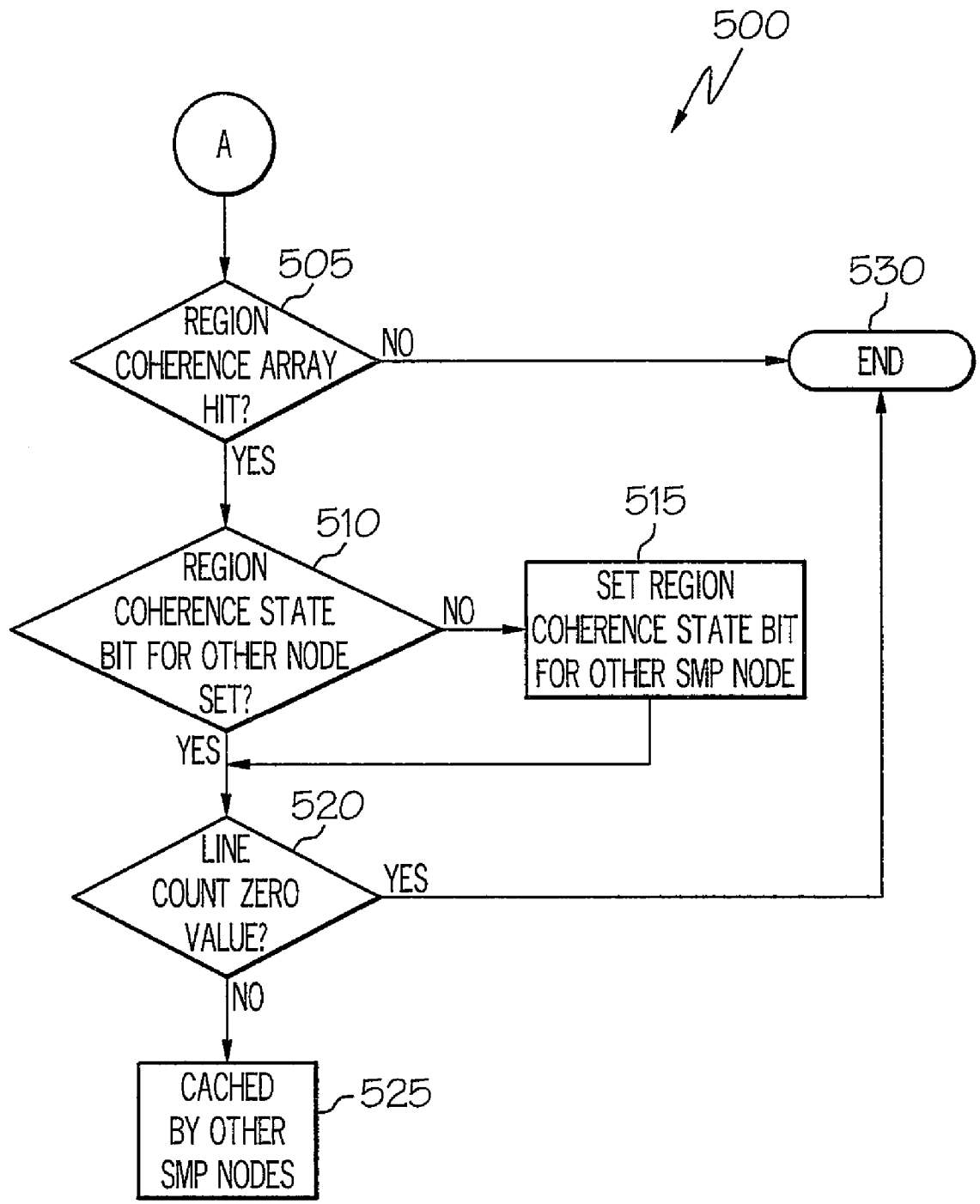
FIG. 5 is a high level logical flowchart of an embodiment of a region coherence protocol operation having an external request from a processor of another SMP node, according to the present invention.

Referring to FIG. 4, there is illustrated a high level logical flowchart of an embodiment of a region coherence protocol operation 400 having an external request from a processor of the same SMP node 10 (for an embodiment of a two-level interconnect hierarchy), according to the present invention. Referring to FIG. 5, there is illustrated a high level logical flowchart of an embodiment of a region coherence protocol operation 500 having an external request from a processor of another SMP node 10 (for an embodiment of a two-level interconnect hierarchy), according to the present invention. For FIGS. 4 and 5, while the process steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

For clarity, FIGS. 4 and 5 illustrate actions taken on external snoop requests (from a processor 200 of the same SMP node 10, and from a processor 200 of another SMP node 10, respectively) to generate information regarding where a requested line of data can be found. Note also from FIGS. 4 and 5 that the present region coherence protocol also implements an improved form of dynamic self-invalidation, described above, that does not throw away the external status of a region in the process of giving another processor 200 exclusive access to the region. The processor 200 indicates that it has no lines cached even in cases where the region which includes the requested line is indicated in the RCA 280, provided the line-count value is zero or all the presence bits have a zero value. Thus, the region is not actually invalidated.

Referring to FIG. 4, a region coherence protocol operation 400 is depicted having an external request for a line at operation A from a processor of the same SMP node 10. For external snoop requests from the same SMP node 10, the processor 200 responds at operation 405 that it is caching lines from the region of the requested line when the region is indicated in the RCA 280 of the processor 200 by an examination of the region coherence state bits 250 of the RCA 280 at operation 405, and the line-count value (or presence bits value) is equal to a non-zero value as determined at operation 420. If it is determined at operation 405 that the processor 200 is not caching lines from the region of the requested line, the operation 400 terminates at operation 430. If the region is not indicated in the RCA 280 at operation 405, or if the region is indicated in the RCA 280 at operation 405 but there is an associated zero line-count value (or zero value presence bits) determined at operation 420, the operation 400 terminates at operation 430 and processor 200 responds that it is not caching lines from the region. At operation 410, it is determined whether the region coherence state bits 250 of the RCA 280 are set to indicate that lines of the region are being cached in the SMP node 10 to which the requesting processor 200 belongs. If not, the region coherence state bits 250 are set at operation 415 to indicate the fact.

Region coherence state bits 250 are not used in the present region coherence protocol to encode information about lines cached by the processor 200, since this information is indicated by the line-count bits 260. Instead, the region coherence protocol only encodes the region coherence state bits 250 of the RCA 280 at operation 415 to indicate the external status of a region for the benefit of the processor 200 by indicating whether or not any processor 200 at a given level of the interconnect hierarchy (in this example, the same SMP node 10) is caching lines from the region. Therefore, a region snoop response is based entirely on the value of the line-count bits (or presence bits) 260 of the RCA 280. If there is a valid entry to indicate at operation 405 that the region is indicated in the RCA 280, this indicates that the processor 200 is caching lines from the region if the line-count bits 260 indicate at operation 420 a non-zero value (or the presence bits indicate a non-zero value), and not otherwise. This information is communicated to the requesting processor 200 via the region snoop response, leaving the region coherence state bits 250 unchanged. If there is no valid entry at operation 405 to indicate the region in the RCA 280, this indicates that the processor 200 is not caching any lines from the region.

Referring to FIG. 5, a region coherence protocol operation 500 is depicted having an external request for a line at operation A from a processor of another SMP node 10 than the processor 200. For external snoop requests from the same SMP node 10, the processor 200 responds at operation 505 that it is caching lines from the region of the requested line when the region is indicated in the RCA 280 of the processor 200 by an examination of the region coherence state bits 250 of the RCA 280 at operation 505, and the line-count value (or presence bits value) is equal to a non-zero value as determined at operation 520. If it is determined at operation 505 that the processor 200 is not caching lines from the region of the requested line, the operation 500 terminates at operation 530. If the region is not indicated in the RCA 280 at operation 505, or if the region is indicated in the RCA 280 at operation 505 but there is an associated zero line-count value (or zero value presence bits) determined at operation 520, the operation 500 terminates at operation 530 and processor 200 responds that it is not caching lines from the region. At operation 510, it is determined whether the region coherence state bits 250 of the RCA 280 are set to indicate that lines of the region are being cached in the SMP node 10 to which the requesting processor 200 belongs. If not, the region coherence state bits 250 are set at operation 515 to indicate the fact.

Region coherence state bits 250 are not used in the present region coherence protocol to encode information about lines cached by the processor 200, since this information is indicated by the line-count bits 260. Instead, the region coherence protocol only encodes the region coherence state bits 250 of the RCA 280 at operation 515 to indicate the external status of a region for the benefit of the processor 200 by indicating whether or not any processor 200 at a given level of the interconnect hierarchy (in this example, another SMP node 10) is caching lines from the region. Therefore, a region snoop response is based entirely on the value of the line-count bits (or presence bits) 260 of the RCA 280. If there is a valid entry to indicate at operation 505 that the region is indicated in the RCA 280, this indicates that the processor 200 is caching lines from the region if the line-count bits 260 indicate at operation 520 a non-zero value (or the presence bits indicate a non-zero value), and not otherwise. This information is communicated to the requesting processor 200 via the region snoop response, leaving the region coherence state bits 250 unchanged. If there is no valid entry at operation 505 to indicate the region in the RCA 280, this indicates that the processor 200 is not caching any lines from the region.

In another embodiment, the proposed region protocol can be extended with a form of cooperative state prefetching. If a processor 200 of a SMP node 10 has an associated RCA 280 state that indicates that no processors 200 outside the same SMP node 10 are caching lines from the region, it can supply this information to other processors 200 of the same SMP node 10 in response to requests sent to the SMP node 10. When a processor 200 on the same SMP node 10 performs a node pump, it can determine whether other processors 200 on the SMP node 10 are caching lines from the requested region and whether other processors 200 on the same SMP node 10 have information that processors 200 outside the SMP node 10 are caching lines from the requested region. The processor 200 can use this information to update the state of its RCA 280, and avoid a subsequent pump to other SMP nodes 10 in the system 5.

This optimization can be implemented with an additional bit in the combined snoop response for each level of the interconnect hierarchy except the first/lowest level. The bit for each upper level of the interconnect hierarchy is asserted during broadcast snoops if a processor 200 at a lower level has an RCA 280 state that indicates there are no processors 200 caching lines from the region at the upper level. These extra bits can be considered "not cached" bits, since they indicate if a level of the interconnect hierarchy is not caching lines from the region. The "not cached" bits may be effectively a complemented bitwise-AND (NAND) of the upper bits of the RCA 280 state. For example, during a node snoop a processor 200 may assert the "not-cached" bit for the level above if the corresponding bit in its RCA 280 state is clear, or zero.

The processor 200 receiving the snoop provides the requestor with information about the level above, cooperatively avoiding unnecessary broadcast snoop. If the "not-cached" bit is set in the snoop response for a request, the corresponding bit in the RCA 280 state for the requestor can be cleared, and subsequent snoop to the corresponding level of the interconnect hierarchy can be avoided. If the snoop response is made available to other processors 200 of the same SMP node 10, they may also clear the corresponding bit in their respective associated RCA 280 in anticipation of future requests.

It is understood that the use herein of specific names are for example only and not meant to imply any limitations on the invention. The invention may thus be implemented with different nomenclature/terminology and associated functionality utilized to describe the above devices/utility, etc., without limitation. While the present invention has been particularly shown and described with reference to a preferred embodiment, it will be understood by those skilled in the art that various changes in form and detail may be made therein without departing from the spirit and scope of the invention. Furthermore, as utilized in the specification and the appended claims, the term "computer" or "system" or "computer system" or "computing device" includes any data processing system including, but not limited to, personal computers, servers, workstations, network computers, main frame computers, routers, switches, personal digital assistants (PDAs), telephones, and any other system capable of processing, transmitting, receiving, capturing, and/or storing data.

It should be understood that at least some aspects and utilities of the present invention may alternatively be implemented in a computer-storage medium that contains a program product. That is, the present invention can also be embodied as programs defining functions in the present invention as computer-readable codes on a computer-readable medium. The computer-storage medium may be a computer-readable medium, which can include a computer-readable recording medium and/or a computer-readable transmission medium, and/or a computer-readable/writeable recording medium. The computer-readable recording medium is any data storage device that can store data which can be thereafter read by a computer system. Examples of a computer-readable recording medium include read-only memory (ROM), and examples of a computer-readable/ writeable recording medium include random-access memory (RAM), CD-ROMs, magnetic tapes, floppy disks, hard disk drives, memory stick devices, and optical data storage devices. The computer-readable recording medium can also be distributed over network coupled computer systems so that the computer-readable code is stored and executed in a distributed fashion. The computer-readable transmission medium can transmit data via a wired or wireless configuration (e.g., wired or wireless data transmission through the Internet). Also, functional programs, codes, and code segments to accomplish the present invention can be easily construed by programmers skilled in the art to which the present invention pertains. Further, it is understood that the present invention may be implemented as a system having means in the form of hardware, software, or a combination of software and hardware as described herein, or their equivalents.

What is claimed is:

1. A method of controlling region coherence in a clustered shared-memory multiprocessor system, the method comprising:
generating a request by a processor for a line of data storable in a system memory;
determining, via examination of at least one entry in a plurality of entries of a region coherence array, at least one level of a multi-level interconnect hierarchy which has recently cached at least one line of data of a region of the system memory, such that the region includes the requested line of data, wherein each entry in the region coherence array has one or more of a valid bit, one or more parity bits, a region address tag, and a plurality of line-count bits, and a non-zero bit, and wherein each entry in the region coherence array also has a region coherence state field, the region coherence state field having one region coherence state bit per level of the multi-level interconnect hierarchy; and
updating the at least one entry in the region coherence array associated with the requesting processor responsive to determining the at least one level of the multi-level interconnect hierarchy.

2. The method of claim 1, further comprising:
determining whether a processor of the determined at least one level of the multi-level interconnect hierarchy has recently cached the requested line of data.

3. The method of claim 1, wherein the request for a line of data is generated by a processor and provided only to processors associated with a same SMP node as the requesting processor.

4. The method of claim 1, wherein the request for a line of data is generated by a processor and provided only to processors associated with a different SMP node than the SMP node of the requesting processor.

5. The method of claim 1, wherein:
the determining of the at least one level of a multi-level interconnect hierarchy includes examination of at least one region coherence state bit; and
the updating of the region coherence array includes setting the region coherence state bit corresponding to the at least one level of the multi-level interconnect hierarchy that includes the requested line of data based on a region snoop response.

6. The method of claim 1, wherein the updating of the region coherence array includes setting the region coherence state bit corresponding to the at least one level of the multi-level interconnect hierarchy that includes the requested line of data.

7. The method of claim 1, wherein each level in the multi-level interconnect hierarchy comprises at least one of:
a group of processors;
a group of processors on a same chip;
a group of processors on a same node;
a group of processors on one or more chips aggregated into a multichip module;
a group of processors on one or more multichip modules on a same printed circuit board;
a group of processors on other printed circuit boards; and
a group of processors in one or more physical cabinets.

8. A region coherence protocol control system, comprising:
a clustered shared-memory multiprocessor system, including:
a processor included within a multi-level interconnect hierarchy of the multiprocessor system;
a region coherence array associated with the processor to provide region coherence status of a region of the system memory, such that the region includes the requested line of data; and
a system memory having stored thereon instructions, that when executed by the processor:
generate a request for a line of data storable in a system memory;
determine via examination of at least one entry in a plurality of entries of the region coherence array at least one level of a multi-level interconnect hierarchy which has recently cached at least one line of data of a region of the system memory, such that the region includes the requested line of data, wherein each entry in the region coherence array has one or more of a valid bit, one or more parity bits, a region address tag, and a plurality of line-count bits, and a non-zero bit, and wherein each entry in the region coherence array also has a region coherence state field, the region coherence state field having one region coherence state bit per level of the multi-level interconnect hierarchy; and
update the at least one entry in the region coherence array associated with the requesting processor responsive to determining the at least one level of the multi-level interconnect hierarchy.

9. The region coherence protocol control system of claim 8, wherein the request for a line of data is generated by a processor and provided only to processors associated with a same SMP node as the requesting processor.

10. The region coherence protocol control system of claim 8, wherein the request for a line of data is generated by a processor and provided only to processors associated with a different SMP node than the SMP node of the requesting processor.

11. The region coherence protocol control system of claim 8, wherein:
the region coherence array is updated based on an examination of at least one line count bit; and
the updating of the region coherence array includes setting the least one region coherence state bit corresponding to the at least one level of the multi-level interconnect hierarchy that includes the requested line of data based on a region snoop response.

12. The region coherence protocol control system of claim 8, wherein the updating of the region coherence array includes setting the region coherence state bit corresponding to the at least one level of the multi-level interconnect hierarchy that includes the requested line of data.

13. A computer program product, comprising:
a tangible computer storage medium; and
program code embodied in said tangible computer storage medium that when executed by a computer provides functionality, including:
generating a request by a processor for a line of data storable in a system memory;
determining via examination of at least one entry in a plurality of entries of a region coherence array at least one level of a multi-level interconnect hierarchy which has recently cached at least one line of data of a region of the system memory, such that the region includes the requested line of data, wherein each entry in the region coherence array has one or more of a valid bit, one or more parity bits, a region address tag, and a plurality of line-count bits, and a non-zero bit, and wherein each entry in the region coherence array also has a region coherence state field, the region coherence state field having one region coherence state bit per level of the multi-level interconnect hierarchy; and updating the at least one entry in the region coherence array associated with the requesting processor responsive to determining the at least one determined level of the multi-level interconnect hierarchy.

14. The computer program product of claim 13, wherein each level in the multi-level interconnect hierarchy comprises at least one of:
a group of processors;
a group of processors on a same chip;
a group of processors on a same node;
a group of processors on one or more chips aggregated into a multichip module;
a group of processors on one or more multichip modules on a same printed circuit board;
a group of processors on other printed circuit boards; and
a group of processors in one or more physical cabinets.

15. The computer program product of claim 14, wherein the requesting processor determines whether the indicated at least one level of the multi-level interconnect hierarchy includes a processor that has recently cached the requested line of data.

16. The computer program product of claim 13, further comprising the function of:
determining whether a processor of the determined at least one level of the multi-level interconnect hierarchy has recently cached the requested line of data.

17. The computer program product of claim 13, wherein the request for a line of data is generated by a processor and provided only to processors associated with a same SMP node as the requesting processor.

18. The computer program product of claim 13, wherein the request for a line of data is generated by a processor and provided only to processors associated with a different SMP node than the SMP node of the requesting processor.

19. The computer program product of claim 13, wherein:
the determining of the at least one level of a multi-level interconnect hierarchy includes examination of at least one region coherence state bit; and
the updating of the region coherence array includes setting the region coherence state bit corresponding to the at least one level of the multi-level interconnect hierarchy that includes the requested line of data based on a region snoop response.

20. The computer program product of claim 13, wherein each level in the multi-level interconnect hierarchy comprises at least one of:
a group of processors;
a group of processors on a same chip;
a group of processors on a same node;
a group of processors on one or more chips aggregated into a multichip module;
a group of processors on one or more multichip modules on a same printed circuit board;
a group of processors on other printed circuit boards; and
a group of processors in one or more physical cabinets.

* * * * *